United States Patent
Breed

(10) Patent No.: US 8,159,338 B2
(45) Date of Patent: Apr. 17, 2012

(54) ASSET MONITORING ARRANGEMENT AND METHOD

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 1178 days.

(21) Appl. No.: 11/380,574

(22) Filed: Apr. 27, 2006

(65) Prior Publication Data

US 2006/0220842 A1    Oct. 5, 2006

Related U.S. Application Data

(63) Continuation-in-part of application No. 11/278,979, filed on Apr. 7, 2006, which is a continuation-in-part of application No. 10/940,881, filed on Sep. 13, 2004, which is a continuation-in-part of application No. 10/457,238, filed on Jun. 9, 2003, now Pat. No. 6,919,803, application No. 11/380,574, which is a continuation-in-part of application No. 10/940,881, and a continuation-in-part of application No. 10/931,288, filed on Aug. 31, 2004, now Pat. No. 7,164,117, which is a continuation-in-part of application No. 10/457,238.

(60) Provisional application No. 60/387,792, filed on Jun. 11, 2002.

(51) Int. Cl.
  *G08B 1/08* (2006.01)
(52) U.S. Cl. ............... 340/539.13; 340/539.1; 340/568.1
(58) Field of Classification Search ............. 340/539.13, 340/531, 539.1, 825.49, 568.1, 825.72
  See application file for complete search history.

(56) References Cited

U.S. PATENT DOCUMENTS

| | | | | |
|---|---|---|---|---|
| 4,999,614 A | * | 3/1991 | Ueda et al. | 340/588 |
| 5,691,980 A | * | 11/1997 | Welles et al. | 370/316 |
| 5,825,283 A | | 10/1998 | Camhi | |
| 5,917,405 A | | 6/1999 | Joao | |
| 5,959,568 A | * | 9/1999 | Woolley | 342/42 |
| 6,300,875 B1 | | 10/2001 | Schafer | |
| 6,356,192 B1 | | 3/2002 | Menard et al. | |
| 6,359,570 B1 | | 3/2002 | Adcox | |
| 6,370,222 B1 | | 4/2002 | Cornick, Jr. | |
| 6,509,868 B2 | * | 1/2003 | Flick | 342/357.07 |
| 6,542,076 B1 | | 4/2003 | Joao | |

(Continued)

OTHER PUBLICATIONS

Carol Williams, "060324 Everlasting power in the offing", New Scientist Print Edition, Mar. 24, 2006.

*Primary Examiner* — Travis Hunnings
(74) *Attorney, Agent, or Firm* — Brian Roffe

(57) ABSTRACT

Arrangement and method for monitoring an asset includes a location determining system and a self-powered interior sensor and communication system which data about contents in the interior of the asset and transmits the data and the location of the asset. It includes a transmitter and receiver for communicating directly with a wireless ISP such that the data about the contents and the location of the asset are available to a user having access to the Internet and a user having access to the Internet can direct communications to the interior sensor and communications system. A triggering device is coupled to the interior sensor and communication system and arranged to detect an event which might cause a change in the contents or condition of the asset. The triggering device directs the interior sensor and communication system to obtain data about the contents when such an event is detected.

28 Claims, 4 Drawing Sheets

U.S. PATENT DOCUMENTS

| | | |
|---|---|---|
| 6,542,077 B2 | 4/2003 | Joao |
| 6,549,130 B1 | 4/2003 | Joao |
| 6,553,336 B1 | 4/2003 | Johnson et al. |
| 6,587,046 B2 | 7/2003 | Joao |
| 6,614,349 B1 | 9/2003 | Proctor et al. |
| 6,725,158 B1 | 4/2004 | Sullivan |
| 6,745,027 B2 * | 6/2004 | Twitchell, Jr. ............. 455/422.1 |
| 6,847,906 B2 | 1/2005 | Ozawa |
| 6,919,803 B2 | 7/2005 | Breed |
| 6,925,335 B2 * | 8/2005 | May et al. ......................... 700/9 |
| 6,948,681 B2 | 9/2005 | Stupakis |
| 6,975,941 B1 | 12/2005 | Lau et al. |
| 6,982,656 B1 | 1/2006 | Coppinger et al. |
| 7,030,755 B2 | 4/2006 | Bohinc, Jr. |
| 2004/0014339 A1 | 1/2004 | Machado |
| 2005/0046584 A1 | 3/2005 | Breed |
| 2005/0137786 A1 | 6/2005 | Breed et al. |
| 2005/0174235 A1 | 8/2005 | Davis et al. |
| 2005/0200700 A1 * | 9/2005 | Schofield et al. ............. 348/148 |
| 2005/0248444 A1 | 11/2005 | Joao |
| 2006/0047379 A1 | 3/2006 | Schullian |
| 2006/0071786 A1 | 4/2006 | Fano |

* cited by examiner

ASSET MONITORING ARRANGEMENT AND METHOD

CROSS REFERENCE TO RELATED APPLICATIONS

This application is a continuation-in-part (CIP) of:

1. U.S. patent application Ser. No. 11/278,979 filed Apr. 7, 2006 which is a CIP of U.S. patent application Ser. No. 10/940,881 filed Sep. 13, 2004 which is a CIP of U.S. patent application Ser. No. 10/457,238 filed Jun. 9, 2003; now U.S. Pat. No. 6,919,803, which claims priority under 35 U.S.C. §119(e) of U.S. provisional patent application Ser. No. 60/387,792 filed Jun. 11, 2002, now expired; and 2. U.S. patent application Ser. No. 10/940,881 filed Sep. 13, 2004 which is a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002, now expired; and 3. U.S. patent application Ser. No. 10/931,288 filed Aug. 31, 2004, now U.S. Pat. No. 7,164,117, which is a CIF of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002, now expired.

All of the above-referenced applications are incorporated by reference herein.

FIELD OF THE INVENTION

The present invention also relates to systems for remotely monitoring transportation assets and other movable and/or stationary items which have very low power requirements. In particular, the present invention relates to a system for attachment to shipping containers and other transportation assets which enables remote monitoring of the location, contents, properties and/or interior or exterior environment of shipping containers or other assets and transportation assets and, since it has a low power requirement, lasts for years without needing maintenance.

The present invention also relates to a tracking method and system for tracking shipping containers and other transportation assets and enabling recording of the travels of the shipping container or transportation asset.

BACKGROUND OF THE INVENTION

A detailed background of the invention is found in the parent applications, U.S. patent application Ser. No. 10/931,288, now U.S. Pat. No. 7,164,117, and Ser. No. 10/940,881, incorporated by reference herein.

The definitions set forth in section 15 of the Background of the Invention section of the '881 application are also incorporated by reference herein.

All of the patents, patent applications, technical papers and other references referenced in the '881 application and herein are incorporated herein by reference in their entirety.

OBJECTS AND SUMMARY OF THE INVENTION

It is an object of the present invention to provide new and improved arrangements and methods for monitoring an asset and an asset including such an arrangement.

It is an object of the present invention to provide new and improved arrangements and methods for tracking an asset.

It is another object of the present invention to provide a technique to maximize energy on an asset which is used to operate a monitoring and tracking system.

It is an object of the present invention to provide new and improved methods and arrangements for detecting whether an object is present in an interior space of a movable asset such as a vehicle. Possible interior spaces of movable assets include the passenger compartment of an automobile and the cargo bay of a truck trailer.

Another object of the present invention is to provide a technique to conserve energy provided on an asset while optimizing communication of data and information from the asset to a remote monitoring facility.

Still another object of the present invention is to use the Internet to provide for communications between an asset and a remote monitoring facility.

Objects of other inventions disclosed herein are set forth in the '881 application.

In order to achieve these objects and others, an asset including an arrangement for monitoring the asset and an interior of the asset in accordance with the invention includes a location determining system arranged at least in part on the asset and to determine the location of the asset, and a self-powered interior sensor and communication system arranged on the asset. The interior sensor and communication system obtains data about contents in the interior of the asset and transmits data about the contents in the interior of the asset and the location of the asset. To this end, it includes a transmitter and receiver for communicating directly with a wireless Internet service provider (ISP) such that the data about the contents in the interior of the asset and the location of the asset are available to a user having access to the Internet and a user having access to the Internet can direct communications to the interior sensor and communications system. The communication may be to perform a data gathering stage.

The location determining system may include a first component on the asset which obtains GPS satellite information and a processing component apart from the asset which processes the GPS satellite information.

The transmitter can arranged to transmit only to a non-satellite ISP. For example, when the asset is a container being shipped on a boat, the transmitter can be arranged to transmit to an ISP resident on the boat which in turn is capable of transmitting via a satellite to a distant ISP.

A triggering device or mechanism can coupled to the interior sensor and communication system and arranged to detect one of a set of one or more predetermined events which might cause a change in the contents of the asset or the condition of the asset. The triggering device directs the interior sensor and communication system to obtain data about the contents when such an event is detected. For example, the interior sensor and communication system can include an infrared camera that obtains an infrared image of an interior or exterior of the asset when such an event is detected and is arranged to transmit the image to the wireless ISP with the data about the contents, i.e., the image is additional to the data about the contents.

Alternatively, the interior sensor and communication system includes an infrared camera arranged to obtain an infrared image of an interior or exterior of the asset and is arranged to transmit the image to the wireless ISP, the image is the data obtained by the interior sensor and communication system.

The interior sensor and communication system may obtain data by receiving waves or energy and process the received waves or energy into data.

To maximize or optimize energy use by the interior sensor and communication system, an energy generating system can be arranged on the asset for generating energy to power the part of the location determining system on the asset and the interior sensor and communication system. The energy generating system can generate energy from movement of the asset or a part thereof or the environment of the asset.

In one embodiment, at least one environment sensor is arranged on the asset to obtain data about the environment in which the asset is located different than the location of the asset. The interior sensor and communication system is coupled to the at least one environment sensor and transmits the data about the environment in which the asset is located to the wireless ISP.

Another form of an asset including an arrangement for monitoring the asset and an interior of the asset in accordance with the invention includes a frame, a location determining system mounted to the frame and arranged to determine the location of the asset, an interior sensor system mounted to the frame and arranged to obtain data about contents in the interior of the asset, and a communication system coupled to the interior sensor system and the location determining system. The communication system is mounted to the frame and to transmit data about the contents in the interior of the asset and the location of the asset. It preferably comprises a transmitter and receiver for communicating directly with a wireless Internet service provider such that the data about the contents in the interior of the asset and the location of the asset is available to a user having access to the Internet and a user having access to the Internet can direct communications to the interior sensor and communications system. Optionally, a triggering device is coupled to the interior sensor system and arranged to detect one of a set of one or more predetermined events which might cause a change in the contents of the asset or the condition of the asset. The triggering device directs the interior sensor system to obtain data about the contents when such an event is detected.

Another option is an energy generating system mounted to the frame for generating energy to power the location determining system, the interior sensor system and the communication system. The energy generating system may generate energy from movement of the asset or a part thereof or the environment of the asset.

Another option is to provide the communication system is provided with an Internet protocol (IP) address such that transmissions from the communication system are associatable with an identification of the asset.

A method for monitoring the asset and an interior of the asset includes performing a data gathering stage by determining the location of the asset and obtaining data about contents in the interior of the asset, after the data gathering stage, transmitting data about the contents in the interior of the asset and the location of the asset directly to a wireless Internet service provider (ISP), enabling a user to access the data transmitted to the ISP, and enabling a user to direct communications to the asset to cause the effecting of the data gathering stage.

Additionally, the method may entail generating energy to power systems that determine the location of the asset and obtain data about contents in the interior of the asset from movement of the asset or the environment of the asset, enabling the user to direct communications to the asset to cause adjustment of operating parameters of at least one of a system which determines the location of the asset and a system which obtains data about the contents of the asset and/or predetermining one or more events to initiate performance of the data gathering stage and performing the data gathering stage only after detecting one of the predetermined events.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

DETAILED DESCRIPTION OF THE INVENTION

Figure 1:
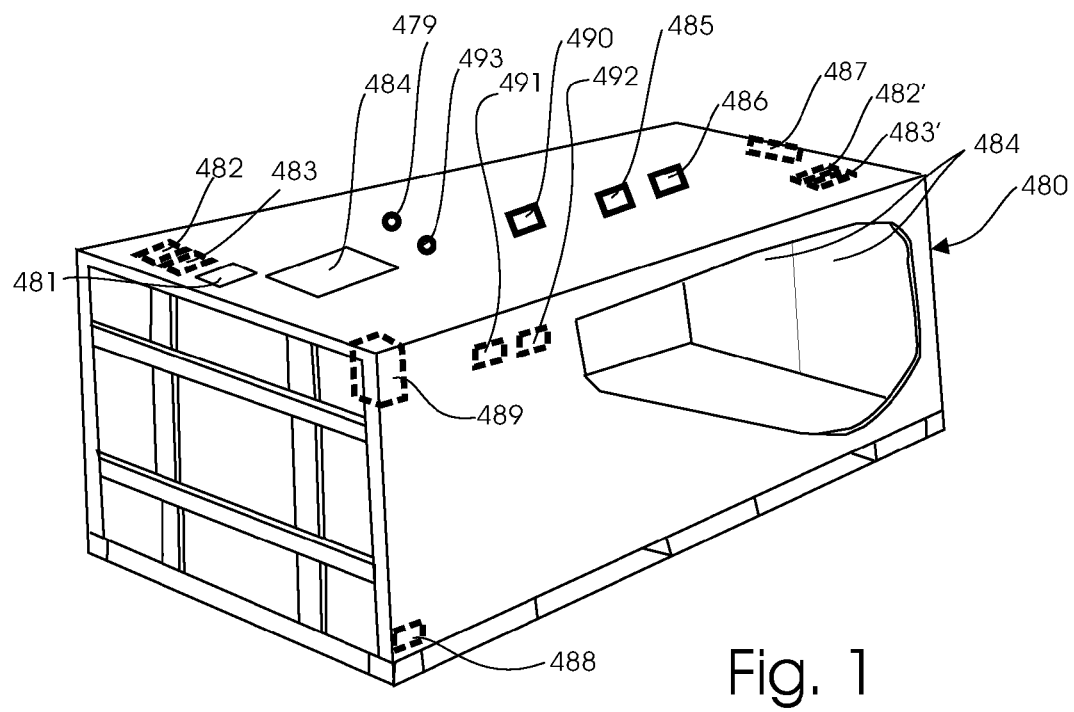
FIG. 1 is a perspective view showing a shipping container including one embodiment of the monitoring system in accordance with the present invention.

Note whenever a patent or literature is referred to below it is to be assumed that all of that patent or literature is to be incorporated by reference in its entirety to the extent the disclosure of these reference is necessary. Also note that although many of the examples below relate to a particular vehicle, an automobile, the invention is not limited to any particular vehicle and is thus applicable to all relevant vehicles including shipping containers and truck trailers and to all compartments of a vehicle including, for example, the passenger compartment and the trunk of an automobile or truck.

Monitoring of Cargo Containers, Truck Trailers and Railroad Cars

1. Monitoring the Interior Contents of a Shipping Container, Trailer, Boat, Shed, etc.

Commercial systems are now available from companies such as Skybitz Inc. 45365 Vintage Park Plaza, Suite 210, Dulles, Va. 20166-6700, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases, an ultracapacitor as discussed in the '881 application can be used in place of a battery.

The Skybitz system by itself only provides information as to the location of a container and not information about its contents, environment, and/or other properties. At least one of the inventions disclosed herein disclosed here is intended to provide this additional information, which can be coded typically into a few bytes and sent to the satellite along with the container location information and identification. First consider monitoring of the interior contents of a container. From here on, the terms "shipping container" or "container" will be used as a generic cargo holder and will include all cargo holders including standard and non-standard containers, boats, trucks, trailers, sheds, warehouses, storage facilities, tanks, buildings or any other such object that has space and can hold cargo. Most of these "containers" are also vehicles as defined above.

One method of monitoring the space inside such a container is to use ultrasound such as disclosed in U.S. Pat. Nos. 5,653,462, 5,829,782, U.S. RE 37,260 (a reissue of U.S. Pat. No. 5,943,295), U.S. Pat. Nos. 5,901,978, 6,116,639, 6,186,537, 6,234,520, 6,254,127, 6,270,117, 6,283,503, 6,341,798, 6,397,136 and RE 37,260 for monitoring the interior of a vehicle. Also, reference is made to U.S. Pat. No. 6,279,946, which discusses various ways to use an ultrasonic transducer while compensating for thermal gradients. Reference is also made to U.S. Pat. Nos. 5,653,462, 5,694,320, 5,822,707, 5,829,782, 5,835,613, 05,485,000, 5,488,802, 5,901,978, 6,309,139, 6,078,854, 6,081,757, 6,088,640, 06,116,639, 6,134,492, 6,141,432, 6,168,198, 6,186,537, 6,234,519, 6,234,520, 60,242,701, 6,253,134, 6,254,127, 6,270,116, 6,279,946, 6,283,503, 6,324,453, 06,325,414, 6,330,501, 6,331,014, RE 37,260 U.S. Pat. Nos. 6,393,133, 60,397,136, 6,412,813, 06,422,595, 6,452,870, 6,442,504, 6,445,988, 6,442,465, which disclose inventions that may be incorporated into the invention(s) disclosed herein.

Consider now a standard shipping container that is used for shipping cargo by boat, trailer, or railroad. Such containers are nominally 8'w×8'h×20' or 40' long outside dimensions; however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other and in the present invention, the same transducer can be used both as the transmitter and receiver. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

Note that in many cases, several transducers are used for monitoring the vehicle such as a container that typically point in slightly different directions. Naturally, this need not be the case and a movable mounting is also contemplated where the motion is accomplished by any convenient method such as a magnet, motor, etc.

Figure 2:
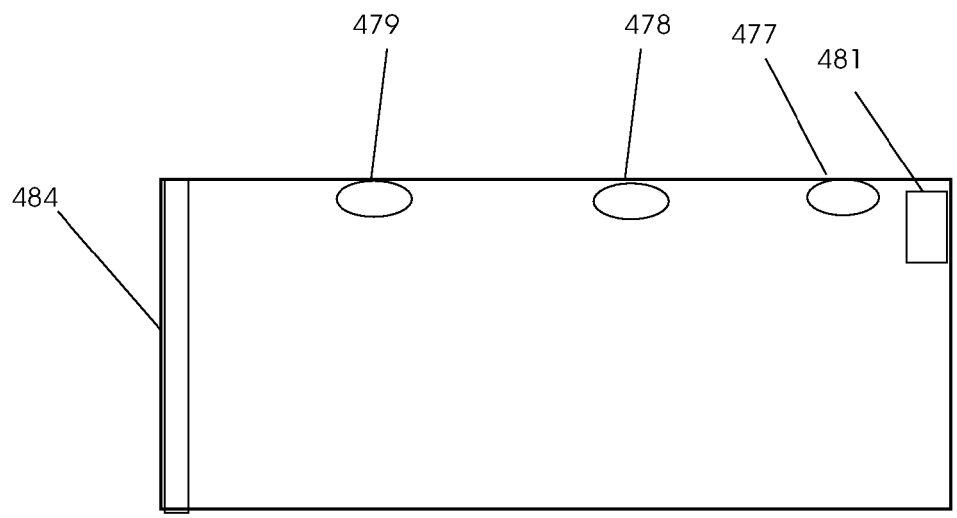
FIG. 2 is a cross-sectional view of the shipping container shown in FIG. 1.

Referring to FIGS. 1 and 2, a container 480 is shown including an interior sensor system 481 arranged to obtain information about contents in the interior of the container 480. The interior sensor system 481 includes a wave transmitter 482 mounted at one end of the container 480 to a frame thereof, or to an attachment to the frame, and which operatively transmits waves into the interior of the container 480 and a wave receiver 483 mounted adjacent the wave transmitter 482, also possibly to the frame or an attachment thereto, and which operatively receives waves from the interior of the container 480. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The interior sensor system 480 and communication system 485, wherein together in the same housing or apart in different housings, or even if not housed within any enclosure, can all be mounted to the fame of the container 480. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and, as discussed more fully below, be designed to compensate for thermal gradients in the interior of the container 480.

Information about the contents of the container 480 may comprise the presence and/or motion of objects in the interior. The processor may be associated with a memory unit which can store data on the location of the container 480 and the analysis of the data from the interior sensor system 481. The processor associated with or integral with the interior sensor system 481 can apply pattern recognition techniques to determine the presence of objects in the interior space of the container 480 and/or motion or other properties of the objects in the interior space of the container 480. One technique uses wave comparison by comparing waves received at different times.

It is also possible to perform object (cargo) detection by directing ultrasonic waves into the interior space so that they are reflected off of any objects in the interior space of the container 480. The amplitudes of the reflected waves are compared to thresholds obtained or derived from reflections in the absence of the objects in the container 480. Thus, the thresholds are set to accommodate the reflections expected or actually obtained from an empty container 480, removing the reflections from the door 484, floor and side walls. Since the amplitude is significantly affected by humidity, humidity compensation (described below) is extremely desirable.

The interior sensor system 480 can determine the volume of the contents of the container 480, whether the container 480 is moving, whether anything in the container 480 is moving, emitting a sound or other radiation (EM or atomic), emitting a vapor or gas that can be sensed (electronic nose), emitting volatile biological entities that can be sensed (biosensor) etc. It can also determine the temperature or other property of the container 480 and/or its contents. The container 480 also includes a location determining system 486 which monitors the location of the container 480. To this end, the location determining system can be any asset locator in the prior art, which typically includes a GPS receiver, transmitter and appropriate electronic hardware and software to enable the position of the container 480 to be determined using GPS technology or other satellite or ground-based technology including those using the cell phone system or similar location-based systems.

In one embodiment, the location of the container 480 can be determined using a simple retransmission of some of the GPS satellite information, only whatever is necessary, obtained from the location determining system 486. Ideally, very few or no calculations with respect to precise location determination will be done on the container 480 to conserve power. Thus, in this case, raw or minimally processed GPS data is transmitted by the interior sensor system 481 and processed off-site to derive a precise determination of the location of the container 480.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet. The communication from communication system 485 can also be sent directly to a wireless Internet service provider (ISP), provided the communication system 485 is capable of communication therewith, e.g., the ISP is in the transmission range of a transmitter portion of the communication system 485. Once the data contained in the communication has been transmitted to the ISP, it can then travel to the owner or manager of the container 480, the owner or operator of the container monitoring system, to government security personnel, etc. One important advantage of the communication system 485 is that since it enables bi-directional communications with the ISP, via a transmitter and receiver (not the same as the transmitter 482 and receiver 483 of the interior sensor system 481), it can also enable the owner or manager of the container 480 to interrogate the container 480 by directing commands to the interior sensor system 481 to begin a data gathering stage. Whenever a data gathering stage is complete and information is ready to be sent to the ISP, the location determining system 485 would also provide data about the location of the container 480. For the case where a container 480 is on a ship, the communication system 485 can communicate with an ISP on the ship which then may communicate to a land-based internet portal or ISP through a variety of ways, such as by satellite. The transmitter of the communication system 485 will not communicate directly to or with a satellite, other than possibly receiving GPS signals if the transmitter is also used as part of the location determining system 485.

Communication system 485 can use a variety of transmission systems in addition to or instead of the Internet-based communications. Transmission methods include use of a cell phone network, DSRC, OnStar.

The container 480 also can include a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on switches, magnetic sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 can be coupled to the interior sensor system 481, or at least to the transmitters 482,482' so that the transmitters 482,482' can be designed to transmit waves into the interior of the container 480 only when the door status sensor 487 detects when at least one door 484 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 480 and the doors 484 closed, an initial pulse transmission can be initiated and the received signal stored to provide a vector of data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in detail in the above-referenced patents and patent applications through the use, for example, of a logarithmic compression circuit. There are other methods of minimizing the effect on the reflected wave magnitudes that will accomplish substantially the same result, some of which are disclosed elsewhere herein.

To allow for temperature compensation, one or more temperature sensors 479 are arranged on the container 480 to measure or otherwise determine the temperature of the atmosphere in the interior of the container 480. In view of thermal gradients in the longitudinal and transverse directions of the container 480, preferably multiple temperature sensors 479 are provided. Temperature sensors 479 provide the temperature(s) to a processor which controls or is part of the interior sensor system 481, i.e., ultrasonic wave transmitter 482 and wave receiver 483, to change the transmission frequency of the ultrasonic waves being transmitted by the wave transmitter 482 as a function of the temperature. In this manner, the frequency of the ultrasonic waves can be optimal for the temperature conditions in the container 480. Additional discussion about wave frequency compensation as a function of temperature is set forth in section 1.1.2.9 of the '979 application.

In addition to instead of altering a transmission parameter of the ultrasonic waves via the ultrasonic transmitter 482 based on temperature, it is also possible to alter an analysis parameter, i.e., the manner in which any reflected waves are processed, based on temperature. Specifically, as described above, when processing received ultrasonic waves, a portion of the waves can be removed, this portion being considered noise or irrelevant to the determination of information about objects in the field of the ultrasonic waves. When transmitted into an interior space of the container 480, the removed portions could be those portions reflecting from the structure of the container 480 itself. Now, it has been found that the amount of waves to be removed, i.e., the size of the removed portion, can be adjusted as a function of the temperature in the container 480 to maintain the same interrogation distance of the ultrasonic transducer. This means that if an area within a set range from the transducer is being monitored and only waves reflecting from objects in that range are desired, reflected waves received by the ultrasonic receiver 483 are processed to eliminate portions which reflect from objects outside of that range and these portions are varied depending on the temperature. Without varying the size of the portions removed from reflected waves, as the temperature varies inside the container 480, different areas of the container 480 would be monitored to obtain information about objects and thus inconsistent and possibly erroneous information would be obtained.

When the complicating aspects of thermal gradients are taken into account, in many cases, a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described in considerable detail for automobile interior monitoring in the above-referenced patents and patent applications, and elsewhere herein, and therefore this process need not be repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Naturally, other locations of such a scanning system are possible. An alternate scanning approach can use a digital Light Processing™ device (DLP) from Texas Instruments. In this case, the scanner can provide an arbitrarily controlled two-dimensional scan and thus can be mounted on the container ceiling and can be commanded to scan a particular part of the container where detailed information may be desired.

In both of these examples, relatively little can be said about the contents of the container other then that something is present or that the container is empty. Frequently, this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an ISP, LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container, or another property of the objects in the container. Motion of objects within the container 480 would be reflected as differences between the waves received by the transducers (indicative of differences in distances between the transducer and the objects in the container) or images (indicative of differences between the positions of objects in the images). Such motion can also aid in image segmentation which in turn can aid in the object identification process. This is particularly valuable if the container is occupied by life forms such as humans.

As discussed in section 1.1.2.10 of the '979 application, humidity also affects ultrasonic wave propagation. Therefore, one or more humidity sensors 478 can be arranged on the container 480 to measure or otherwise determine the humidity of the atmosphere in the interior of the container 480 (see FIG. 2). Humidity sensors 478 provide the humidity to a processor which controls or is part of the interior sensor system 481, i.e., ultrasonic wave transmitter 482 and wave receiver 483, to change parameters of the processing of the ultrasonic waves as function of humidity (if such a change is determined to be necessary to obtain a meaningful, acceptable or optimal wave analysis). Such parameters include transmission parameters such as the frequency, gain and power of the ultrasonic waves being transmitted by the wave transmitter 482 and reception parameters, such as amplification of the returned waves and the size and location of only a portion of the returned wave signal which is to be analyzed. In particular, the gain values of the ultrasonic waves are adjusted based on humidity since humidity contributes more than about 2 orders of magnitude to the amplitude of reflected wave signals.

Since one particular combination which affects ultrasonic wave propagation is the combination of low humidity and high temperature, temperature sensors 479 and humidity sensors 478 could be used in combination to enable the interior sensor system 481 to optimize the transmission and reception of ultrasonic waves in consideration of both the temperature and humidity of the atmosphere in the interior space of the container 480.

In the systems of FIGS. 1 and 2, wires (not shown) are used to connect the various sensors and devices. It is contemplated that all of the units in the monitoring system can be coupled together wirelessly, using for example the Bluetooth, WI-FI or other protocol. Also, as shown in FIG. 2, the interior sensor system 481 is arranged on the far side of the container 480 farthest away from the door 484. Alternative or additional mounting locations include along or on other sides of the container 480.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones or MIR (Micropower Impulse Radar). Note that all such sensors regardless of where they are placed are contemplated herein and are part of the present inventions.

Chemical and/or biological sensors 491 based on surface acoustic wave (SAW), vibrating MEMS beams or other technology can, in many cases, be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals and biological agents. A separate SAW or similar device may be needed for each chemical species or biological agent (or in some cases, each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, SAW or equivalent-based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the afore mentioned SAW devices in connection within or on a vehicle for any purpose other than tire pressure and temperature monitoring or torque monitoring is new and contemplated by the inventions disclosed herein. Naturally only a small number of examples are presented of the general application of the SAW, or RFID, technology to vehicles.

Other sensors that can be designed to operate under very low power levels include microphones 492 and light sensors 493 or sensors sensitive to other frequencies in the electromagnetic spectrum as the need arises. The light sensors 493 could be designed to cause activation of the interior sensor system 481 when the container is being switched from a dark condition (normally closed) to a light situation (when the door or other aperture is opened). A flashlight could also activate the light sensor 493.

The battery system can be similar to that used by SkyBitz (namely, eight to twenty 9-Volt batteries). The SkyBitz system can last for 5 years and must communicate with a GEO satellite which is the main power user. Preferably, the battery system will be designed to last at least twice that long, e.g., about 10 years, and if energy harvesting is available (discussed below), it should last indefinitely.

Instead of one or more batteries providing power to the interior sensor system 481, the communication system 485 and the location determining system 486, solar power can be used. In this case, one or more solar panels 494 are attached to the upper wall of the container 480 (see FIG. 1) and electrically coupled to the various power-requiring components of the monitoring system. A battery can thus be eliminated. In the alternative, since the solar panel(s) 494 will not always be exposed to sunlight, a rechargeable battery can be provided which is charged by the solar panel 494 when the solar panels are exposed to sunlight. A battery could also be provided in the event that the solar panel 494 does not receive sufficient light to power the components of the monitoring system. In a similar manner, power can temporarily be supplied by a vehicle such as a tractor either by a direct connection to the tractor power or though capacitive, inductive or RF coupling power transmission systems. As above an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

In one embodiment, interior sensor system 481 can be a self-contained unit, i.e., with all components of the system in a common housing mounted on or attached to the walls defining the container 480. When an energy supply component is also included in the common housing, the interior sensor system 480, which would also provide for communications and thus is actually an interior sensor and communication system, constitutes a self-contained asset monitor that can last several years (2, 5, 10) depending on usage, without service while providing data about contents in the interior of the container 480 and the location of the container 480 periodically, say once a day.

Container 480 can also include accelerometers, angular motion detectors, an IMU or any other inertial sensor. On command, periodically or when an incident or event occurs (shock, motion, chemical detection etc.), the interior sensor system 481 can include an infrared camera which takes an IR flash photograph of the interior of the asset (or in some cases, the exterior of the asset) and transmits the image over the internet. An image, or information derived from the image, can constitute the data or information being provided along with asset's location to the ISP or can be provided in addition to the data or information obtained from other sources.

Container 480 may also contain a device for harvesting energy from the environment, such as from asset vibrations (see, for example, "Everlasting power in the offing", New Scientist Print Edition, Mar. 24, 2006, Caroline Williams) or from solar power. As shown in FIG. 2, container 480 can include an energy generating system 477 which generates energy to power at least the location determining system 486 and the interior sensor system 481 and the communication system 485. Connections between the energy generating system 477 and the location determining system 486, the interior sensor system 481 and the communication system 485 are not shown but may be wires. Energy generating system 447 may generate energy from movement of the container 480 or a part thereof or the environment of the container 480.

The system described above is mainly intended for shipping containers and truck trailers but it can be used on any vehicle including boats, trains, automobiles, trucks, and even airplanes. It can also be used on fixed assets where the location function would not be required.

The system may or may not use an identification mechanism, such as an Internet protocol (IP) address. If the interior sensor system 480 and communication system 485, when combined into a self-powered unit, is provided with an IP address, communications from the self-powered, combined interior sensor and communication system can be readily associated with an identification of the container 480 on which the interior sensor and communication system is arranged. Multiple systems, each arranged on a different container 480, would be provided with unique IP addresses to enable management of a system with multiple assets or containers 480.

When the container is made from metal, one or more antennas can be placed on the exterior of the container. The device program can be changed by the owner or manager via the internet to change operating parameters (what is sensed, alarm levels, frequency of updating sensor readings, frequency of automatic transmission, etc.)

A monitoring system for an asset could include not only the interior sensor system 481 described above but also a system which is capable of diagnosing failures of the carrier of the container, e.g., such as a failing truck trailer tire when the container is being moved by truck. This is discussed below.

An advantage of the systems described above which apply Internet-based communications is that they will be able to replace SkyBitz and other satellite-based systems when the Internet becomes more or less ubiquitous.

2. Monitoring the Entire Asset

Immediately above, monitoring of the interior of the container is described. If the container is idle, there may not be the need to frequently monitor the status of the container interior or exterior until some event happens. Thus, all monitoring systems on the container can be placed in the sleep mode until some event such as a motion or vibration of the container takes place. Other wakeup events could include the opening of the doors, the sensing of light or a change in the interior temperature of the container above a reference level, for example. When any of these chosen events occurs, the system can be instructed to change the monitoring rate and to immediately transmit a signal to an ISP, a satellite or another communication system, or respond to a satellite-initiated signal for some LEO-based, or geocentric systems, for example, or an internet-derived signal from an ISP. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use.

Figure 3:
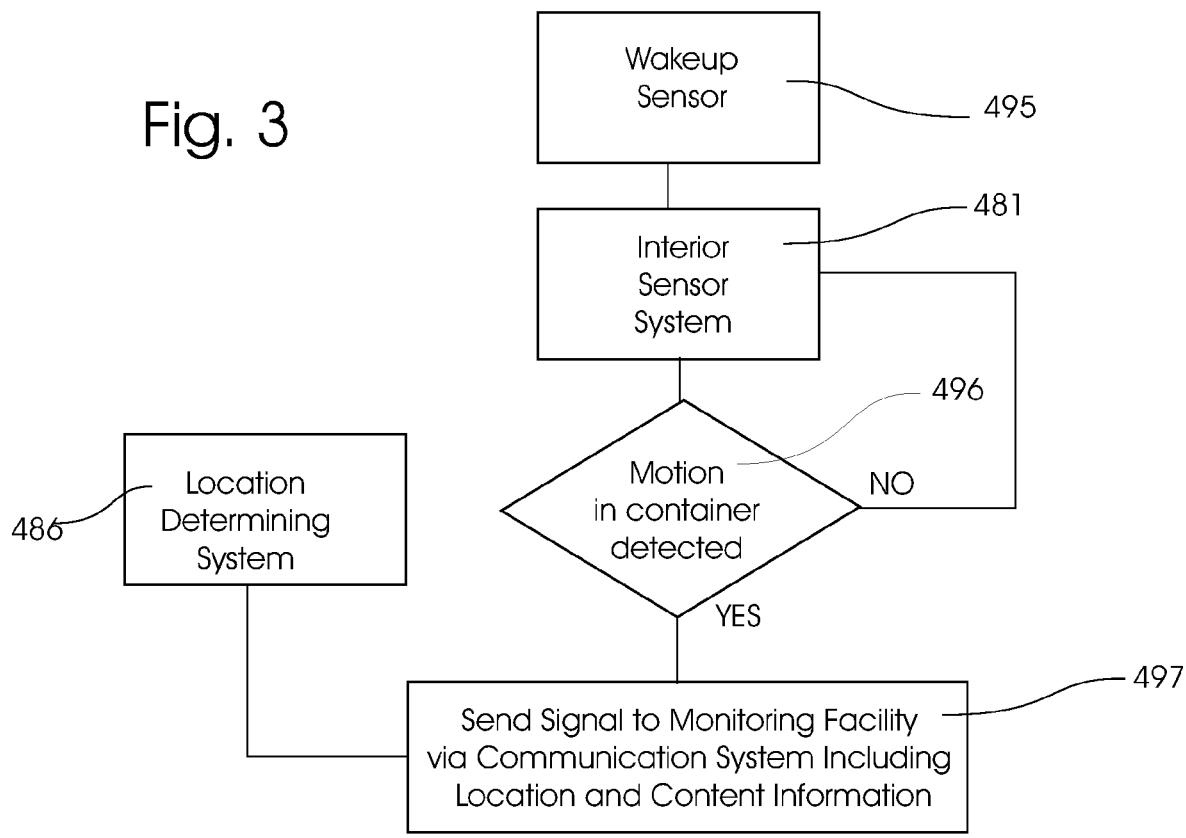
FIG. 3 is a flow chart showing one manner in which a container is monitored in accordance with the invention.

FIG. 3 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of "sleep". In this manner, the wakeup sensor would not be activated repeatedly in traffic stop and go situations.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal is sent at 497 to a monitoring facility via the communication system 485 and which includes the location of the container 480 obtained from the location determining system 486 or by the ID for a permanently fixed container or other asset, structure or storage facility. In this manner, if the motion is determined to deviate from the expected handling of the container 480, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Even the presence of loose cargo can be advantageously detected and the operator could be warned to stop and secure the loose item, e.g., via an audible and/or visual warning or possibly even a communication from the monitoring facility. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing, for example, three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo or contribute to an instability condition. An alternate method is to put weight sensors in the floor or as a mat on the floor of the vehicle. The mat design can use the bladder principles described in the patents and patent applications referenced above for weighing vehicle occupants using, in most cases, multiple chambers. Strain gages or other force or displacement sensors can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined as well as the load that the container contains. This is an alternate method of determining the contents of a container. If several (usually 3) accelerometers and several (usually 3) gyroscopes are used together in a single package then this is known as an inertial measurement unit (IMU). If a source of position is also known such as from a GPS system then the errors inherent in the IMU can be corrected using a Kalman filter, for example.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Another application of monitoring the entire asset would be to incorporate a diagnostic module into the asset. Frequently, the asset may have operating parts, e.g., if it is a refrigerated and contains a refrigeration unit. To this end, sensors can be installed on the asset and monitored using pattern recognition techniques, for example, as disclosed in U.S. Pat. No. 5,809,437 and U.S. Pat. No. 6,175,787. As such, various sensors would be placed on the container 480 and used to determine problems with the container 480 which might cause it to operate abnormally, e.g., if the refrigeration unit were about to fail because of a refrigerant leak. In this case, the information about the expected failure of the refrigeration unit could be transmitted to a facility and maintenance of the refrigeration unit could be scheduled.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.
2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.
3. An infrared or carbon dioxide sensor could be used to detect human presence, although a carbon dioxide sensor would probably require a prolonged exposure depending, for example, on the sensitivity of the sensor.
4. Various motion sensors as discussed above can also be used, but would need to be resistant to triggering on motion typical of cargo transport. Thus a trained pattern recognition algorithm might be necessary.
5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from an entry/person detector could be sent to a communication network, such as the internet, to notify interested parties of the current status. Additionally or alternatively, an audible alarm may be sounded and an image can also be taken to help to identify the intruder. Additionally, motion sensors, such as an accelerometer on a wall or floor of a vehicle such as a container or an ultrasonic or optical based motion detector, such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as can occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

3. Recording

In many cases, it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

Figure 4:
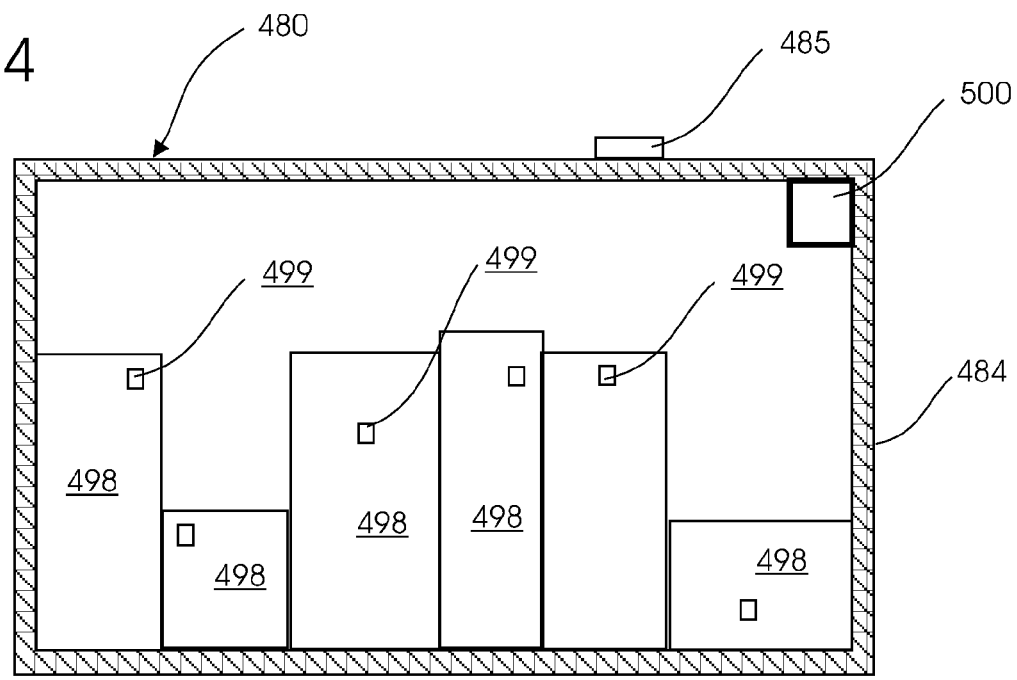
FIG. 4 is a cross-sectional view of a container showing the use of RFID technology in a monitoring system and method in accordance with the invention.

With reference to FIG. 4, in some cases, the individual cargo items 498 can be tagged with RFID or SAW tags 499 and the presence of this cargo in the container 480 could be valuable information to the owner of the cargo. One or more sensors on the container that periodically read RFID tags could be required, such as one or more RFID interrogators 500 which periodically send a signal which will causes the RFID tags 499 to generate a responsive signal. The responsive signal generated by the RFID tags 499 will contain information about the cargo item on which the RFID tag 499 is placed. Multiple interrogators or at least multiple antennas may be required depending on the size of the container. The RFID can be based on a SAW thus providing greater range for a passive system or it can also be provided with an internal battery or ultracapacitor for even greater range. Naturally energy harvesting can also be used if appropriate.

Figure 5:
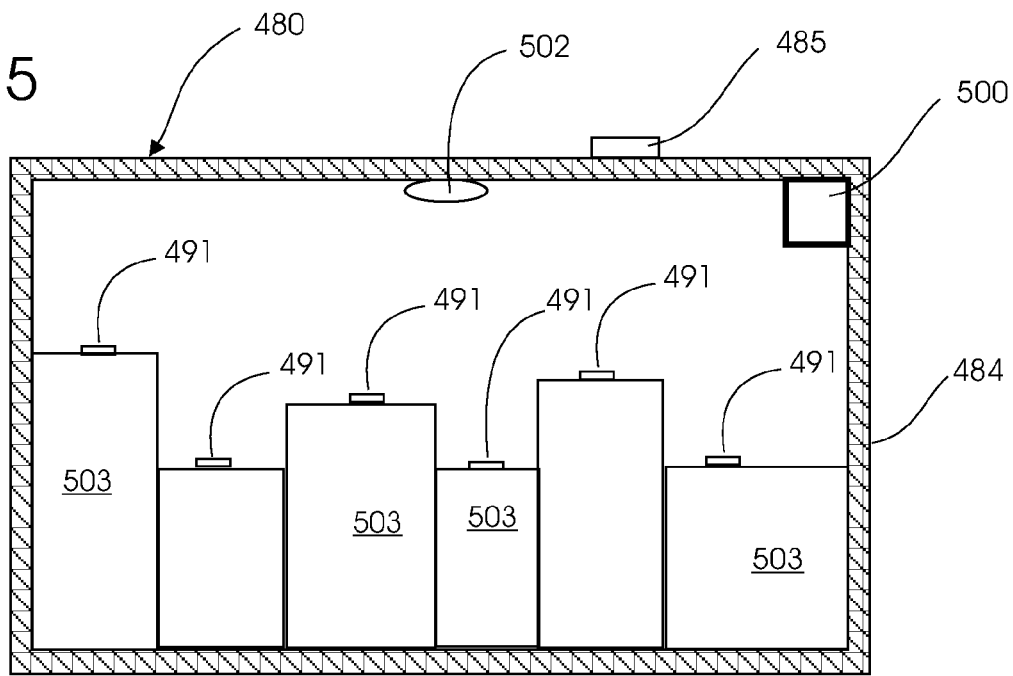
FIG. 5 is a cross-sectional view of a container showing the use of barcode technology in a monitoring system and method in accordance with the invention.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 5, the cargo items in this case are boxes having an equal height so that a space remains between the top of the boxes 501 and the ceiling of the container 480. One or more optical scanners 502, including a light transmitter and receiver, are arranged on the ceiling of the container and can be arranged to scan the upper surfaces of the boxes 503, possibly by moving the length of the container 480, or through a plurality of such sensors. During such a scan, patterns of light are reflected from the barcodes 501 on the upper surfaces of the boxes 503 and received by the optical scanner 502. The patterns of light contain information about the cargo items in the boxes 503. Receivers can be arranged at multiple locations along the ceiling. Other arrangements to ensure that a light beam traverses a barcode 501 and is received by a receiver can also be applied in accordance with the invention. As discussed above, other tag technologies can be used if appropriate such as those based of magnetic wires.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to an ISP or a satellite. Typically, the contents of the container are more valuable than the truck or chassis for the case of when the container is not a trailer. If the tractor, train, plane or ship that is transporting the container is experiencing difficulties, then this information can be transmitted to the ISP or satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. No. 5,809,437 and U.S. Pat. No. 6,175, 787, and herein. Whatever the source of the diagnostic information, especially when valuable or dangerous cargo is involved, this information in coded form can be transmitted to an ISP, other ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology to give greater range or could contain a battery or ultracapacitor for even greater range. The tag can be in a sleep mode until receiving a wakeup call to further conserve battery power.

Figure 6:
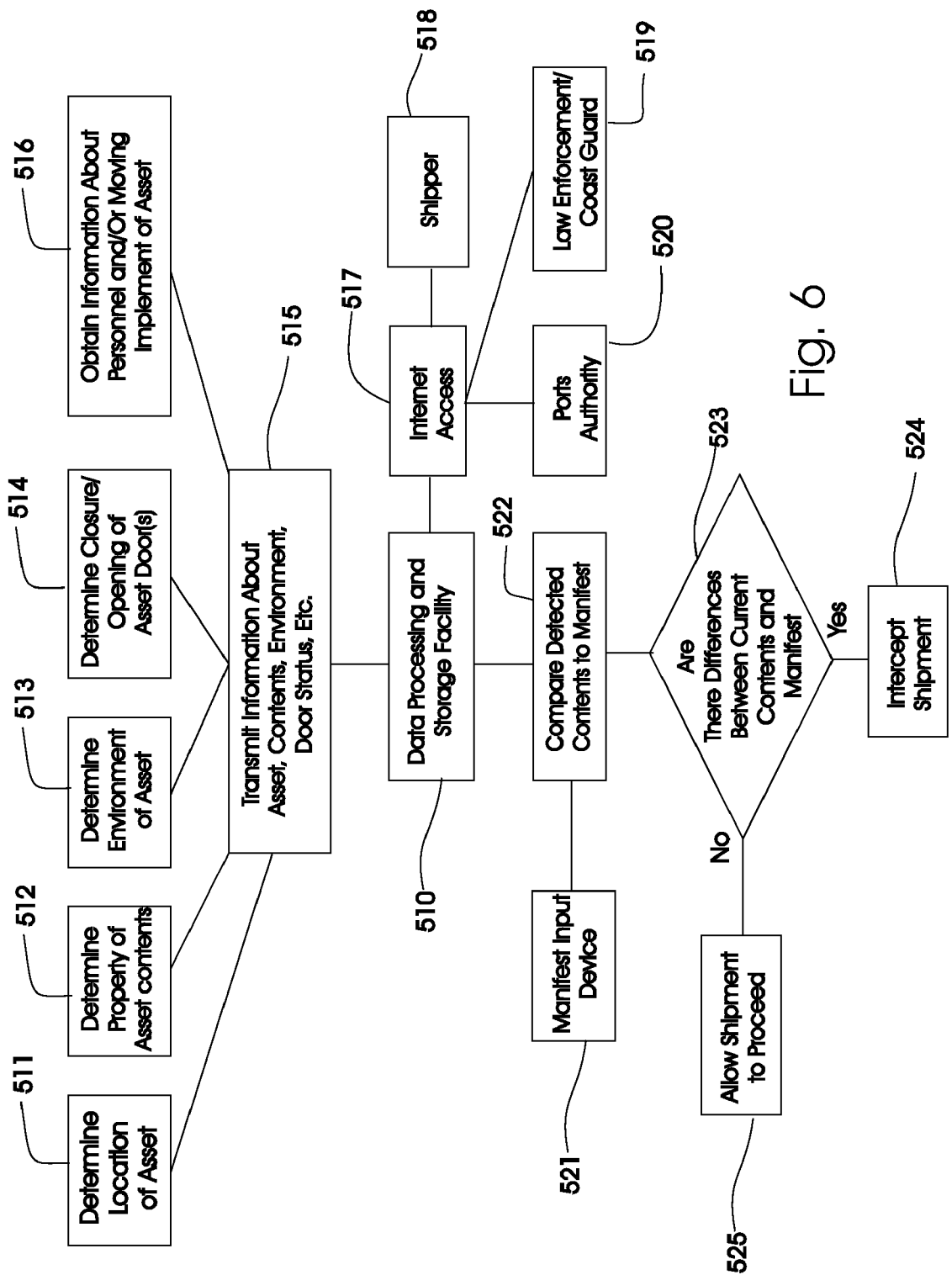
FIG. 6 is a flow chart showing one manner in which multiple assets are monitored in accordance with the invention.

FIG. 6 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525.

4. Exterior Monitoring Near a Vehicle

Having the ability to transmit coded information to an ISP, satellite, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum such as terahertz, capacitive sensors, electric or magnetic field sensors, and chemical sensors among others.

Cameras either with or without a source of illumination can be used to record people approaching the container and perhaps stealing the contents of the container. At the appropriate frequencies, (tetrahertz, for example) the presence of concealed weapons can be ascertained as described in *Alien Vision: Exploring the Electromagnetic Spectrum With Imaging Technology* (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

Naturally a wide variety of smart cards, biometric identification systems (such as fingerprints, voice prints and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to an ISP or a satellite, such as provided by the Skybitz Corporation as described above and others.

Thus, as mentioned above, many new opportunities now exist for applying a wide variety of sensors to a cargo container or other object as discussed above and below. Through a communication system such as an ISP, LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance.

5. Analysis

Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power ISP or satellite monitoring system is that the amount of data routinely sent to the ISP or satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the ISP or satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. Naturally, in some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle. See, for example, UA20040251750, U.S. Pat. Nos. 7,009,310, 6,812,583, 6,809,427 and 6,768,230, Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

6. Safety

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the ISP or satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with an ISP, an LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

7. Other Remote Monitoring

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when an ubiquitous internet begins to be available or a satellite system exists such as the Skybitz, for example, LEO or geostationary satellite system coupled with a low cost low power small GPS receiver and communication device capable of sending information periodically to the ISP or satellite. Once the ISP or satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the GPS container location information. It need not be done onboard the container. Using accurate digital maps the location of the container on the earth can be extremely precisely determined. This principle can now be used for other location determining purposes. The data processing facility that receives the information from the asset via the Internet and/or satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example can be the monitoring of a vacation home during the months when the home is not occupied. Of course, any home can be so monitored even when the occupants leave the home unattended for a party, for example. The monitoring system can determine whether the house is on fire, being burglarized, or whether temperature is dropping to the point that pipes could freeze due to a furnace or power failure. Such a system can be less expensive to install and maintain by a homeowner, for example, than systems supplied by ADT, for example. Naturally, the monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. Naturally, if a power source is available, it can be used to recharge the batteries or as primary power.

Of particular importance, this system and these techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery and/or energy generator, or a wired source of communication. The communication link is generally expected to be via a transmitter and an ISP or LEO, geostationary or other satellite, however, it need not be the case and communication can be by cell phone, an ad hoc peer-to-peer network, IEEE 802.xx (such as Wi-Fi), Bluetooth, or any other wireless system. Thus, using the teachings of at least one of the inventions disclosed herein, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to an ISP, satellite and/or other telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to an ISP and/or satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite and/or ISP.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service. See also section 9.2 in the '881 application.

The invention described here can provide the three above-mentioned highly desired services without requiring a high monthly fee. A simple device that communicates to an ISP, satellite and/or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A "wake-up" can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are the preferred approach.

An additional application is the monitoring of borders such as the on between the United States and Mexico. Sensors can be placed periodically along such a border, at least partially in the ground, and which are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the ISP, satellite and/or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use of the Skybitz system, for example, where the asset mounted device has further wireless communications with other devices in or on the asset. The fact that certain tagged items within or on the assets can be verified if a local area network exists between the Skybitz device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the Skybitz device. The possibilities are endless for determining the presence or operating parameters of a component of occupying item of a remote asset and to periodically communicate this information to an internet site, for example, using a low power asset monitoring system such as the Skybitz system.

The Skybitz, ISP and/or similar system can be used with cell phones to provide a location determination in satisfaction to U.S. Federal regulations. The advantage of this use of Skybitz is that it is available world wide and does not require special equipment at the cell phone station. This also permits an owner of a cell phone to determine its whereabouts for cases where it was lost or stolen. Naturally a similar system can be added to PDAs or other CD players, radios, or any other electronic device that a human may carry. Even non electronic devices such as car keys could be outfitted with a Skybitz type device. It is unlikely that such a device would have a 10 year life but many of them have batteries that are periodically charged and the others could have a very low duty cycle such that they last up to one year without replacement of the battery and then inform the owner that the battery is low. This information process could even involve the sending of an email message to the owner's email stating the location of the device and the fact that the battery needs replacement.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. An asset including an arrangement for monitoring the asset and an interior of the asset into which contents are selectively placed and removed, comprising:
 a location determining system arranged at least in part on the asset, said location determining system being arranged to determine the location of the asset; and
 an interior sensor and communication system arranged on the asset, said interior sensor and communication system being arranged to obtain data about and specific to any contents in the interior of the asset such that independent data is obtained for each of a plurality of different contents, said interior sensor and communication system being arranged to transmit the obtained data about the contents in the interior of the asset and the location of the asset,
 said interior sensor and communication system comprising a transmitter and receiver for communicating with a wireless Internet service provider (ISP) such that the obtained data about the contents in the interior of the asset and the location of the asset is available to a user having access to the Internet,
 said interior sensor and communication system further comprising a camera arranged to obtain at least one image of the interior of the asset and to transmit the at least one obtained image to the wireless ISP, said camera being positioned to obtain images from an area in the interior of the asset in which any contents would be placed such that the at least one obtained image enables data about the contents to be derived by said interior sensor and communication system.

2. The asset of claim 1, wherein said location determining system includes a first component on the asset which obtains GPS satellite information and a processing component apart from the asset which processes the GPS satellite information.

3. The asset of claim 1, wherein said transmitter is arranged to transmit only to a non-satellite ISP.

4. The asset of claim 1, further comprising a triggering device coupled to said interior sensor and communication system and arranged to detect one of a set of one or more predetermined events which might cause a change in the contents of the asset, said triggering device being arranged to direct said interior sensor and communication system to obtain data about the contents currently in the interior of the asset when such an event is detected.

5. An asset including an arrangement for monitoring the asset and an interior of the asset into which contents are selectively placed and removed comprising:
 a location determining system arranged at least in part on the asset, said location determining system being arranged to determine the location of the asset;
 an interior sensor and communication system arranged on the asset, said interior sensor and communication system being arranged to obtain data about and specific to any contents in the interior of the asset such that independent data is obtained for each of a plurality of different contents, said interior sensor and communication system being arranged to transmit the obtained data about the contents in the interior of the asset and the location of the asset, said interior sensor and communication system comprising a transmitter and receiver for communicating with a wireless Internet service provider (ISP) such that the obtained data about the contents in the interior of the asset and the location of the asset is available to a user having access to the Internet;
 a triggering device coupled to said interior sensor and communication system and arranged to detect one of a set of one or more predetermined events which might cause a change in the contents of the asset, said triggering device being arranged to direct said interior sensor and communication system to obtain data about the contents currently in the interior of the asset when such an event is detected; and
 a camera arranged to obtain at least one image of an interior or exterior of the asset when such an event is detected, said interior sensor and communication system being coupled to said camera and being arranged to transmit the at least one obtained image to the wireless ISP with the data about the contents.

6. The asset of claim 1, wherein said interior sensor and communication system is arranged to obtain data by receiving waves or energy and process the received waves or energy into data.

7. The asset of claim 1, further comprising an energy generating system arranged on the asset for generating energy to power at least one of the part of said location determining system on the asset and said interior sensor and communication system, said energy generating system being arranged to generate energy from movement of the asset or a part thereof or the environment of the asset.

8. The asset of claim 1, further comprising at least one environment sensor adapted to be arranged on the asset, said at least one environment sensor being arranged to obtain data about the environment in which the asset is located different than the location of the asset, said interior sensor and communication system being coupled to said at least one environment sensor and transmitting the data about the environment in which the asset is located, and obtained by said at least one environment sensor, to the wireless ISP.

9. The asset of claim 1, wherein said interior sensor and communication system includes a plurality of batteries for providing power to components in said interior sensor and communication system.

10. The asset of claim 1, wherein said interior sensor and communication system is provided with an Internet protocol (IP) address such that transmissions from said interior sensor and communication system are associatable with an identification of the asset.

11. An asset including an arrangement for monitoring the asset and an interior of the asset into which contents are selectively placed and removed, comprising:
- a frame;
- a location determining system mounted to said frame and arranged to determine the location of the asset;
- an interior sensor system mounted to said frame and arranged to obtain data about and specific to any contents in the interior of the asset such that independent data is obtained for each of a plurality of different contents; and
- a communication system coupled to said interior sensor system and said location determining system, said communication system being mounted to said frame and arranged to transmit the data about the contents in the interior of the asset obtained by said interior sensor system and the location of the asset determined by said location determining system,
- said communication system comprising a transmitter and receiver for communicating directly with a wireless Internet service provider (ISP) such that the obtained data about the contents in the interior of the asset and the location of the asset is available to a user having access to the Internet,
- said interior sensor system comprising at least one illumination device for illuminating the interior of the asset and at least one camera arranged to obtain at least one image of the interior of the asset which has been illuminated by said at least one illumination device, said communication system being arranged to transmit data about the contents, which is derived from the at least one obtained image, to the wireless ISP.

12. The asset of claim 11, further comprising a triggering device coupled to said interior sensor system and arranged to detect one of a set of one or more predetermined events which might cause a change in the contents of the asset, said triggering device being arranged to direct said interior sensor system to obtain data about the contents currently in the interior of the asset when such an event is detected.

13. The asset of claim 11, further comprising an energy generating system mounted to said frame for generating energy to power at least one of said location determining system, said interior sensor system and said communication system, said energy generating system being arranged to generate energy from movement of the asset or a part thereof or the environment of the asset.

14. The asset of claim 11, wherein said communication system is provided with an Internet protocol (IP) address such that transmissions from said communication system are associatable with an identification of the asset.

15. A method for monitoring the asset and an interior of the asset into which contents are selectively placed and removed, comprising:
- performing a data gathering stage by determining the location of the asset and obtaining data about and specific to any contents in the interior of the asset such that independent data is obtained for each of a plurality of different contents;
- after the data gathering stage, transmitting the obtained data about the contents in the interior of the asset and the determined location of the asset to a wireless Internet service provider (ISP);
- enabling a user to access the data transmitted to the ISP; and
- enabling the user to direct communications to the asset to cause adjustment of operating parameters of at least one of a system which determines the location of the asset and a system which obtains data about the contents of the asset.

16. The method of claim 15, further comprising generating energy to power at least one of the systems that determine the location of the asset and obtain data about contents in the interior of the asset from movement of the asset or the environment of the asset.

17. The method of claim 15, further comprising:
- predetermining one or more events to initiate performance of the data gathering stage; and
- performing the data gathering stage only after detecting one of the predetermined events.

18. The method of claim 15, further comprising associating an Internet protocol (IP) address with the asset such that data transmitted to the ISP from the asset is associated with the IP address and an identification of the asset is derivable from the IP address.

19. The asset of claim 1, wherein at least part of said interior sensor and communication system is self-powered.

20. The asset of claim 1, wherein said interior sensor and communication system is arranged to obtain data by transmitting waves or energy into the interior of the asset, receiving waves or energy reflected, transmitted or modified by any contents in the interior of the asset and processing the received waves or energy into data.

21. The asset of claim 1, further comprising a triggering device coupled to said interior sensor and communication system and arranged to detect one of a set of one or more predetermined events which might cause a change in the condition of the asset, said triggering device being arranged to direct said interior sensor and communication system to obtain data about any contents currently present in the interior of the asset when such an event is detected.

22. The asset of claim 1, wherein the data about the contents in the interior of the asset which is obtained by said interior sensor and communication system includes a category of the contents, an identification of the contents, a change in position of the contents, or motion of the contents relative to the asset.

23. The asset of claim 1, wherein said interior sensor and communication system is arranged such that a user having access to the Internet can direct communications to said interior sensor and communication system.

24. An asset including an arrangement for monitoring the asset and an interior of the asset into which contents are selectively placed and removed comprising:
- a location determining system arranged at least in part on the asset, said location determining system being arranged to determine the location of the asset;
- an interior sensor and communication system arranged on the asset, said interior sensor and communication system being arranged to obtain data about and specific to any contents in the interior of the asset such that independent data is obtained for each of a plurality of different contents, said interior sensor and communication system being arranged to transmit the obtained data about the contents in the interior of the asset and the location of the asset, said interior sensor and communication system comprising a transmitter and receiver for communicating with a wireless Internet service provider (ISP) such that the obtained data about the contents in the interior of the asset and the location of the asset is available to a user having access to the Internet; and
- a triggering device coupled to said interior sensor and communication system and arranged to detect one of a set of one or more predetermined events which might cause a change in the contents of the asset, said triggering device being arranged to direct said interior sensor and communication system to obtain data about the contents currently in the interior of the asset when such an event is detected;

wherein said interior sensor and communication system comprises at least one illumination device for illuminating the interior of the asset or an area exterior of the asset when such an event is detected and at least one camera arranged to obtain at least one image of the interior or exterior of the asset which has been illuminated by said at least one illumination device when such an event is detected, said interior sensor and communication system being arranged to transmit the at least one obtained image to the wireless ISP with the obtained data about the contents.

25. The asset of claim 1, wherein said interior sensor and communication system further comprises at least one illumination device for illuminating the interior of the asset in conjunction with the obtaining of images via said camera.

26. The asset of claim 11, further comprising a triggering device coupled to said interior sensor system and arranged to detect one of a set of one or more predetermined events which might cause a change in the condition of the asset, said triggering device being arranged to direct said interior sensor system to obtain data about the contents currently in the interior of the asset when such an event is detected.

27. The asset of claim 11, wherein said interior sensor system and said communication systems are arranged such that a user having access to the Internet can direct communications to said interior sensor system via said communication system.

28. The method of claim 15, further comprising enabling a user to direct communications to the asset to initiate the data gathering stage.

* * * * *